(12) United States Patent
Boutique et al.

(10) Patent No.: US 7,960,330 B2
(45) Date of Patent: Jun. 14, 2011

(54) MICROCAPSULES

(75) Inventors: Jean-Pol Boutique, Gembloux (BE); Walter August Maria Broeckx, Berlare (BE); Jonathan Richard Stonehouse, Windlesham (GB); Walter Franciscus Joanna Vanderveken, Wilrijk (BE); Anna-Louise McConnachie, Newcastle (GB)

(73) Assignee: The Procter & Gamble Company, Cincinnati, OH (US)

( * ) Notice: Subject to any disclaimer, the term of this patent is extended or adjusted under 35 U.S.C. 154(b) by 652 days.

(21) Appl. No.: 11/209,908

(22) Filed: Aug. 23, 2005

(65) Prior Publication Data
US 2006/0040844 A1 Feb. 23, 2006

(30) Foreign Application Priority Data

Aug. 23, 2004 (EP) .................................. 04255057
Dec. 3, 2004 (EP) .................................. 04257534

(51) Int. Cl.
*C11D 17/00* (2006.01)
*C11D 3/37* (2006.01)
*A61K 9/50* (2006.01)

(52) U.S. Cl. ........ 510/337; 510/221; 510/321; 510/349; 510/405; 510/441; 424/490; 424/493

(58) Field of Classification Search .................. 510/221, 510/337, 349, 405, 441, 321; 424/490, 493
See application file for complete search history.

(56) References Cited

U.S. PATENT DOCUMENTS

| 5,139,783 | A | * | 8/1992 | Handjani et al. | 424/401 |
|---|---|---|---|---|---|
| 5,204,111 | A | * | 4/1993 | Handjani et al. | 424/451 |
| 5,716,920 | A | | 2/1998 | Glenn, Jr. et al. | |
| 6,153,208 | A | * | 11/2000 | McAtee et al. | 424/402 |
| 6,165,503 | A | | 12/2000 | Gaserod et al. | |
| 6,855,681 | B1 | * | 2/2005 | Ness et al. | 510/349 |
| 7,435,715 | B2 | * | 10/2008 | Broeckx et al. | 510/441 |
| 2002/0106511 | A1 | * | 8/2002 | Callisen | 428/402.2 |
| 2005/0026800 | A1 | * | 2/2005 | Broeckx et al. | 510/276 |

FOREIGN PATENT DOCUMENTS

| EP | 0 376 385 | 7/1990 |
|---|---|---|
| WO | WO 93/24112 | 12/1993 |

* cited by examiner

*Primary Examiner* — Lorna M Douyon
(74) *Attorney, Agent, or Firm* — Armina E. Matthews; James F. McBride; Andrew J. Mueller

(57) ABSTRACT

Microcapsule for use in a liquid detergent composition, the microcapsule having a core and a polymeric polyanion-polycation complex shell wherein the polyanion component is capable of gelling in the presence of calcium and has a storage modulus when gelled with 0.05 moles/litre of calcium of less than about 150 Pa at an angular frequency of about 0.5 rad/s and a polyanion concentration of about 3.8% by weight at 25° C. The invention also relates to a process for making the microcapsules, liquid detergents comprising the microcapsules and cleaning methods using the liquid detergents.

8 Claims, No Drawings

MICROCAPSULES

TECHNICAL FIELD

The present invention is in the field of microcapsules, in particular it relates to microcapsules having a core and a polymeric polyanion-polycation complex shell wherein the polyanion is capable of forming a weak gel in the presence of calcium, a process for making them, liquid detergents comprising the microcapsules and their use for laundering, dishwashing and other purposes.

BACKGROUND OF THE INVENTION

Liquid detergent comprising microcapsules are very appealing to consumers. The inclusion of microcapsules in liquid detergents is desirable not only for aesthetic reasons but also for functional reasons such as isolation of incompatible ingredients, controlled and/or delayed release, etc. Ideally, the microcapsules are stably suspended in the liquid detergent and only dissolve/disintegrate in-use. This makes the design of the microcapsules technically very challenging. In-use conditions can vary widely depending on a number of factors, including cleaning temperature, hardness of the cleaning water, duration of the cleaning process, etc.

The use of microcapsules in liquid detergents is known from the literature. WO 02/055649 discloses a method for the production of microcapsules containing washing and/or cleaning substances with semi-permeable capsule shells (membranes) by means of complexing suitable polyelectrolytes.

Semi-permeable type microcapsules known from the literature do not seem to be strong enough to withstand the liquid detergent manufacture process and transport and at the same time be capable of breaking in use without leaving residues. The generation of residues is made worse under stressed use conditions, such as low temperature, hard water and short duration cleaning.

One objective of the present invention is to provide strong microcapsules for use in liquid detergents capable of dissolving/disintegrating under a wide variety of conditions including stressed conditions. In particular, the microcapsules should be suitable for use in laundry liquid detergents dissolving/disintegrating without leaving residues even when using a heavily loaded drum, a short wash cycle, low wash temperature and/or hard water.

SUMMARY OF THE INVENTION

Microcapsules having a core and a polymeric polyanion-polycation complex shell for use in liquid detergents should be designed in such a way that they are capable of being stably suspended in the liquid matrix, withstand manufacture and transport conditions, and dissolve/disintegrate during the wash process. The microcapsules have a semipermeable membrane (shell) which permits the transfer of ions between the core and the liquid or gel matrix of the detergent, by osmotic effect, until equilibrium is substantially reached, thereby contributing to the physical stability of the microcapsules in the matrix. Without being bound by theory, it is believed that when the detergent containing microcapsules is introduced into fresh water, for example during a cleaning process, the gradient of ionic strength between the wash water and the microcapsule draws water into the core, exerting high pressure on the shell which consequently disintegrates. This mechanism together with the shear exerted during the cleaning process contributes to the breakage of the microcapsules in use.

It has been found that microcapsules are prone to form residues. This tendency has been found to be more acute under stressed conditions, such as heavily loaded drum, short cleaning cycles, low temperature and hard water conditions. The microcapsules of the invention do not generate residues under stressed conditions.

Tap water, containing metal ions—such as calcium—is generally used for cleaning with a liquid detergent. Liquid detergents may also include calcium ions, as part of the cleaning ingredients and/or aqueous matrix, for instance for enzyme stability. Without wishing to be bound by theory, it is believed that the polyanion of the microcapsule is prone to interact, specially cross-link, with the calcium either from the cleaning water, the liquid detergent or both. This interaction can give rise to gellation of the polyanion. If the gel formed is too strong, it will not dissolve/disintegrate in water leaving residues on the cleaned items.

In the case of a laundry process, the microcapsules can be exposed in the washing liquor to a high concentration of calcium proceeding from different sources, such as the feed water, the laundry load itself, garments which have been previously laundered can contain calcium left behind after the evaporation of the water during the drying step, some soils, etc. Laundry liquid detergents tend to be under built, relative to total calcium and other hardness ions, i.e. they cannot bind all the calcium present in the wash process, especially under stressed conditions.

According to a first aspect of the invention, there is provided a microcapsule for use in a liquid detergent composition, the microcapsule having a core and a polymeric polyanion-polycation complex shell. The polyanion component, in aqueous solution, is capable of forming a weak gel in the presence of calcium. By weak gel is understood a polyanion-calcium gel, formed from 0.05 moles/l of calcium (released in situ from a Ca-EDTA solution, as described herein below) having a storage modulus of less than about 150 Pa. The storage modulus is measured as detailed herein below.

A preferred polyanion for use in the microcapsules of the invention is alginate. Alginate is the general name given to alginic acid and its salts. Alginic acid is a linear polysaccharide consisting of (1,4) linked β-D-mannuronate (M) and its C-5 epimer α-L-guluronate (G) residues arranged in a non-regular blockwise pattern along the linear chain. The chemical composition and sequence of the M and G blocks depend on the biological source, growth and seasonal conditions. There are three dimmer blocks in alginate MM, GG and MG. The ratio of mannuronic to guluronic units is known as the M:G ratio. In preferred embodiments the polyanion is alginate having an M:G ratio of at least about 1:1, preferably at least about 1.1:1, more preferably at least about 1.3:1 and even more preferably at least about 1.5:1. Preferably the alginate has a fraction of GG blocks of less than about 0.5, more preferably less than about 0.4 and even more preferably less than about 0.3. Preferably the alginate has a molecular weight of less than about 500 KDa. Again, without wishing to be bound by theory, it is believed that divalent and multivalent cations form stronger gel with G residues, especially blocks of G residues, than with M residues and this leads to poor dissolution/disintegration characteristics and consequent residue formation. Divalent cations, especially calcium ions, take part in the interchain binding between G blocks and give rise to a three-dimensional network in the form of a gel. The binding zone between the G blocks is described by the so-called "egg-box model".

The most preferred alginate for use in the microcapsules of the invention is that having: i) an M:G ratio of at least about 1:1, preferably at least about 2:1, more preferably at least about 3:1 and even more preferably at least about 4:1; ii) a fraction of GG blocks of less than about 0.5, more preferably less than about 0.4 and even more preferably less than about 0.3; and iii) a molecular weight of less than about 500 KDa.

The microcapsules of the invention, which are preferably spherical with a diameter of from about 0.1 to about 10 mm, should be readily visible when placed in a liquid detergent. Visibility can be achieved by colour contrast, by for example having a coloured transparent or translucid (i.e., see through) liquid comprising microcapsules of a different colour or having a colourless liquid with coloured microcapsules or vice-versa.

When present, the pigment level is preferably in the range of from about 0.001 to about 0.2%, more preferably from about 0.06 to about 0.1% by weight of the microcapsule. Preferably, the microcapsules of the invention comprise less than about 0.05%, more preferably less than about 0.01% by weight of pigment and even more preferably they are free of pigment. This low level or absence of pigment contributes to the lack of residues when the microcapsules are used in a cleaning process.

Preferably, the microcapsules of the invention comprise emulsified oil in the core providing a whitish appearance to the microcapsules even without the presence of pigments or dyes.

In another aspect of the invention, there is provided a microcapsule for use in a liquid detergent composition, the microcapsule having a core and a polymeric polyanion-polycation complex shell wherein the polyanion component is alginate having a ratio of mannuronic to guluronic units of at least about 1:1, preferably at least about 1.1:1, more preferably at least about 1.3:1 and even more preferably at least about 1.5:1. Preferably the alginate has a fraction of GG blocks of less than about 0.5, more preferably less than about 0.4 and even more preferably less than about 0.3. Preferably the alginate has a molecular weight of less than about 500 KDa. Preferably the microcapsule comprises less than about 0.05%, more preferably less than about 0.01% by weight of pigment and even more preferably they are free of pigment. Preferably, the microcapsule comprises emulsified oil in the core.

In preferred embodiments the microcapsules are capable of withstanding a force before bursting (measured as described herein below) of from about 20 mN to about 20,000 mN, preferably from about 50 mN to about 15,000 mN and more preferably from about 100 mN to about 10,000 mN. This strength makes them suitable for industrial handling, including the liquid detergent making processes. They can withstand pumping and mixing operations without significant breakage and are also stable on transport. At the same time the microcapsules disintegrate readily in use even under stressed conditions. The microcapsules have a wide operating window, eliminating the need to design different microcapsules for use under different conditions.

According to a process aspect of the invention, there is provided a process for making a microcapsule for use in a liquid detergent composition, the microcapsule having a core and a polymeric polyelectrolyte complex shell. The microcapsule is made from a polyanion component capable of forming a weak gel, in aqueous solution, (as described herein above) in the presence of calcium. The process comprises the following steps:

a. forming a first solution comprising the polyanion component;

b. forming droplets of the first solution; and c. introducing the droplets into a second solution comprising a polymeric polycation component capable of reacting with the polyanion component to form a complex at the surface of the droplets.

The term "solution" as used herein includes liquid or gel compositions having a main component and at least a second component dissolved, dispersed or emulsified therein.

Preferably, the polyanion is alginate having an M:G ratio of at least about 1:1, preferably at least about 2:1, more preferably at least about 3:1 and even more preferably at least about 4:1. Preferably the alginate has a fraction of GG blocks of less than about 0.5, more preferably less than about 0.4 and even more preferably less than about 0.3. Preferably the alginate has a molecular weight of less than about 500 KDa. Preferably the microcapsule comprises less than about 0.05%, more preferably less than about 0.01% by weight of pigment and even more preferably the microcapsule is free of pigment. Preferably, the microcapsule comprises emulsified oil in the core.

In a preferred embodiment the second solution has a pH of from about 1 to 4, more preferably from about 1.5 to about 3 and even more preferably from about 2 to about 2.5. Low pHs favour a low curing time having a positive influence in the strength of the microcapsules. Preferably the polycation is chitosan, preferably having a degree of acetylation of about 94%. According to another aspect of the invention, there is provided a liquid detergent composition comprising the microcapsules of the invention. In a preferred embodiment the liquid detergent composition comprises from about 0.5 to about 30%, preferably from about 2 to about 15% by weight of the composition of detersive builder. Builders improve the cleaning performance of the compositions herein and can include any of the sequestering, chelating or precipitating types. Examples of such builders include $C_{12-18}$ fatty acids and citric acid, typically neutralized by alkali metal hydroxides, amines or alkanolamines. A preferred builder for use herein is a mixture comprising from about 2 to about 15% by weight of the composition of $C_{12-18}$ fatty acids and citric acid in a weight ratio of from about 10:1 to about 1:10, preferably from about 5:1 to about 1:5, more preferably from about 3:1 to about 1:3.

The present inventors have newly identified a drawback with microcapsules of the prior art when used in laundry liquid detergents. The known microcapsules do not seem to completely dissolve without leaving residues on the washed garments, especially under stressed washing conditions, such as heavily loaded drums, short wash cycles, low wash temperatures and/or hard water. In order to solve this newly identified problem a preferred embodiment of the invention provides a laundry liquid detergent comprising a suspension of visibly distinctive microcapsules in a liquid carrier suitable for use in laundering fabrics, preferably the microcapsules have a core and a polymeric polyanion-polycation complex shell, wherein the microcapsules have a residuality index of less than about 1, preferably less than about 0.6 more preferably less than about 0.2 according to the stressed conditions wash test defined herein. Preferably, the liquid detergent of this embodiment comprises the microcapsule of the invention described herein above.

By "visibly distinctive microcapsules" is meant microcapsules (preferably spherical and having a diameter of from about 0.1 to about 10 mm) that can be seen in the laundry detergent with the naked eye when the liquid composition is held by the observer about 30 cm away from his eyes. As explained herein above, visibility is preferably obtained by colour contrast between the liquid detergent and the microcapsules. Preferably, the microcapsules are coloured although transparent microcapsules are also envisaged. Transparent microcapsules could also give rise to unwanted residues under stressed conditions.

The residuality index is calculated according to the following method: 11 black garments amounting to a weight of approximately 3.5 kg are loaded into a Miele washing machine type W8810. A dosing ball is placed in the centre of the load containing 180 ml of a heavy duty liquid (HDL), containing 1% by weight of microcapsules. Preferably, the HDL formulae is as specified herein below in table 3.

The inlet water to the washing machine is at a temperature of 5° C. (this can be achieved by a cooling system). The hardness of the water is 4 mmol of calcium and magnesium in a ratio of 3 to 1. The wool cycle (30° C. and 40 min duration) is used. The washed garments are visually assessed to evaluate the presence of residues. The number of garments containing residues is counted. The process is repeated four times and the number of garments containing residues is averaged over the four washes. The average is divided by the number of garments (11), thereby obtaining the residuality index.

In a method aspect of the invention, there is provided a method of cleaning a soiled item or substrate comprising contacting the item or substrate with an aqueous solution comprising the liquid detergent composition of the invention. The method is suitable for a variety of applications, including, hard surface cleaning—manual and automatic dishwashing, toilet rim blocks—, laundry, etc.

The method is especially suitable for laundry. The liquid detergent compositions of the invention when used under stressed conditions such as hard water, i.e. above about 2 mmol/l, preferably between about 3 and 6 mmol/l and more preferably about 4 mmol/l of calcium and magnesium (preferably in a ratio of 3 to 1)—and/or low inlet temperature—about 4-6° C.—and/or low program temperature—about 30° C.—and/or heavy load, do not leave residues on the washed items.

Generally, it is not possible to accurately control in-use wash temperature conditions in a washing machine, even though it is possible to pre-select the program temperature. The machine is filled with water from the mains, the temperature of the inlet water is dictated by the external conditions and widely varies depending, among other things, on the weather. The inlet water is subsequently heated up to the desired program temperature. A considerable difference can exist between the inlet and the program water temperature such that the temperature of the washing liquor could be low for a considerable part of the cycle. These conditions can contribute to the gellation of the beads. The problem can be exacerbated when hard water is used and/or the machine drum is heavily loaded.

The current trend is to design washing machines with low energy consumption, usually involving low temperatures, reduced agitation and longer washing times. These conditions also contribute to the gellation of microcapsules.

In another method aspect of the invention, there is provided a method of cleaning laundry, without leaving visible residues on the clean laundry. The cleaning takes place in a washing machine, under hard water conditions, i.e. above about 2 mmol/l, preferably between about 3 and 6 mmol/l and more preferably about 4 mmol/l of calcium and magnesium (preferably in a ratio of 3 to 1). The cleaning method comprises the step of contacting the laundry with hard water and adding a liquid detergent. The liquid detergent preferably comprises from about 0.3% to about 3%, more preferably from about 0.5 to about 2% and even more preferably from about 0.8 to about 1.5% by weight of the liquid detergent of microcapsules having a core and a polymeric polyanion-polycation complex shell. Preferably, the liquid detergent provides from about 10 to about 2000 ppm, more preferably from about 50 to about 1200 ppm and even more preferably from 500 to 900 ppm of builder in the wash liquor.

The microcapsules are such that they leave no visible residues on laundry according to the test described below. Preferably, the polyanion component, of the microcapsules for use in the cleaning method, is capable of forming a weak gel in aqueous solution in the presence of calcium and has a storage modulus (measured as detailed herein below) of less than about 150 Pa. A preferred polyanion is alginate having an M:G ratio of at least about 1:1, preferably at least about 1.1:1, more preferably at least about 1.3:1 and even more preferably at least about 1.5:1. Preferably the fraction of GG blocks is less than about 0.5, more preferably less than about 0.4 and even more preferably less than about 0.3. Preferably, the molecular weight is less than about 500 KDa.

Whether a laundry process leaves visible residues on the clean garments is evaluated according to the following test. The cotton short cycle program of a Miele Novotronic W8810 machine is used to wash about 12 dark garments weighing, in total, about 4-4.5 kg. The water inlet temperature is about 5-6° C., the wash temperature about 30° C. and the water hardness 4 mmol/l. 180 ml of a laundry liquid detergent comprising 1% by weight of the composition of microcapsules is placed in a dispensing ball and the ball is placed in the middle of the drum. At the end of the program, the garments are visually inspected. If less than 20%, preferably less than 10% and even more preferably less than 5% of the garments present residues, it is concluded that the laundry process leaves no visible residues.

DETAILED DESCRIPTION OF THE INVENTION

The present invention envisages microcapsules (sometimes referred as beads) for use in liquid detergents, a process for making them, liquid detergents comprising said microcapsules and methods of cleaning using the liquid detergents. The microcapsules do not form strong gels and therefore they dissolve/disintegrate in use without leaving residue even under stressed conditions.

The microcapsules preferably take the form of spherical beads with a diameter of from about 0.1 to about 10 mm, which contain a core surrounded by a membrane. The membrane protects the core and any active within the core from the surrounding medium.

The term liquid detergent as used herein includes all flowable fluids having cleaning properties, including liquids and gels for use in manual and automatic laundry, dishwashing, hard surface cleaning, personal cleansing and lavatory rim-blocks.

The microcapsules of the invention are made by a process based on the reaction of two polyelectrolytes of opposite charge (herein also referred as polyanions and polycations) and which are capable of forming a complex. Suitable polyelectrolytes for the present invention can be synthetic or natural polyelectrolytes.

Polyanion

Suitable polyanions for the present invention can be synthetic or natural polyanions which fulfil the requirement of being capable of forming a weak gel in the presence of calcium and having a storage modulus when gelled with 0.05 moles/litre of calcium of less than about 150 Pa at an angular frequency of about 0.5 rad/s and a polyanion concentration of about 3.8% by weight at 25° C.

Synthetic polyanions may be selected from the group consisting of polyacrylates and polymethacrylates, polyvinyl sulphates, polystyrene sulphonates, polyphosphates and mixtures thereof. Natural polyanions may be selected from anionic gums, including alginates, carrageenan, gellan gum, carboxyl methyl cellulose, xanthan gum and mixtures thereof.

Preferred polyanion for use herein is alginate, more preferably Lamitex M45 (ex. FMC), and Manutex RM, Kelgin HV, Manucol LH, Manucol DM and Manucol DH all of them supplied by ISP. The most preferred are Manucol DM and Manucol DH.

Preferred alginates with high levels of mannuronic acid include those derived from the algae *Ascophyllum nodosum* or the algae *Macroystis pyrifera*.

Measurement of the Polyanion Storage Modulus

The polyanion storage modulus is measured in an aqueous solution comprising 3.8% by weight of the polyanion cross-linked with calcium and thereby forming a gel. The calcium-polyanion gel is prepared by in situ release of calcium cations from a Ca-EDTA solution. In this way a homogeneous polyanion gel is obtained and the problem of calcium concentration gradient in the gel is avoided. This method is based on that developed by X. Liu et al., Polymer, vol. 44, pp 407-412 (2003).

Firstly, a gluconate solution is prepared by adding 0.3 g (99% purity) of D-glucono-δ-lactone (GDL, Sigma) to 19.7 g of water and stirring with a magnetic stirrer at 400 rpm for 2 minutes.

Secondly, a Ca-EDTA solution is prepared by adding 1 g of $CaCl_2$ hexahydrate (98% purity) and 44.69 g of 0.01 mol/l of an EDTA aqueous solution to 21.51 g of water. The solution is stirred at 400 rpm with a magnetic stirrer and 0.1 N NaOH aqueous solution (approximately 9 g) is slowly added until the pH becomes stable at a value of about 7.

A polyanion solution is prepared by adding 3.8 g of polyanion, preferably alginate, to the Ca-EDTA solution. The resulting solution is stirred with a turrax ultramixer for 3 minutes, moving the ultramixer through the entire solution using 6,500 rpm for the first minute, 13,500 rpm for the second minute and 21,500 for the third minute.

Thereafter a calcium polyanion solution is prepared by adding the gluconate solution to the polyanion solution. The resulting solution is stirred under the same regime as the polyanion solution (i.e., using 6,500 rpm for the first minute, 13,500 rpm for the second minute and 21,500 for the third minute). The gluconate causes a decrease in the pH of the solution with a consequent decrease in the chelation stability constant of Ca-EDTA, thereby releasing calcium. The resulting calcium polyanion solution is stored at 20° C. for 24 h.

The storage modulus is measured with a rheometer UDS 200 Paar Physica with a cone and plate fixture. The diameter and angle of the cone are 50 mm and 0.04 rad, respectively. Measurements are carried out at 25±0.1° C. After calibrating the apparatus (as indicated in the manual) the strain is set up at 0.5%. A frequency sweep is performed in the range of from 0.1 to 100 $s^{-1}$. 25 points are measured in an automatic mode. The storage modulus is plotted against the frequency.

Measurement of the Polyanion Molecular Weight

The molecular weight is determined via gel permeation chromatography (GPC), using the conventional calibrated GPC technique for data processing. Molecular weights are determined via calibration with a set of narrowly dispersed reference materials: poly ethylene oxide (PEO) standards of molecular weights: 26, 45, 95, 170, 250, 510 and 913 kdalton (peak molecular weight).

A Waters Alliance 2695 separation module gel permeation chromatograph with a Viscotek triple detector (using Refractive Index detection for Conventional Calibration) is used. The control system is the Waters Empower and Viscotek triple detection software. The detection is carried out using a Viscotek Refractive Index. The module comprises two Waters Ultrahydrogel 300×7.8 mm columns, one containing Ultrahydrogel Linear and another one containing Ultrahydrogel 102. The eluent is a 0.1 M aqueous solution of $Na_2HPO_4$ 0.1 M in acetonitrile in a volume ratio of 90:10. The sample injection is 100 μL of a solution having a concentration of polyanion of 2.5 mg/ml at a flow rate of 0.8 mL/min.

Molecular weights of the unknown samples are determined by 'slicing' the chromatographic trace along the time/volume axis and subsequently reading the slice molecular weight for each slice from the PEO calibration curve (Log MW vs Retention time or Volume). Weight average molecular weight is calculated based on the slice molecular weights and their relative intensities. Calibration, slicing and calculation of molecular weights are all performed through the GPC processing software.

Polycation

Suitable cationic synthetic polyelectrolytes may be selected from the group consisting of poly-(N,N,N-trialkylammoniumalkyl)acrylates, poly-(N-alkylpyridinium) salts, polyethylenimines, aliphatic ionenes, poly-(diallyldialkylammonium) salts and mixtures thereof, wherein the alkyl is preferably short chain with from 1 to about 4 carbon atoms, preferably methyl.

Suitable cationic natural polyelectrolytes may be selected from the group consisting of chitosan, chitosan derivatives such as quaternarised chitosan and aminoalkylated and quaternarised celluloses and poly-L-lysine and mixtures thereof.

Preferred for use herein are the combinations of sodium alginate (for the first solution), preferably Manucol DH or DM, with poly-(diallyldimethylammonium)chloride, chitosan polymer (having a molecular weight of from about 10 to 1,000 kDa, preferably from about 50 to 500 kDa), chitosan oligomer (having a molecular weight of from about 300 to about 9,000 Da, preferably from about 500 to about 5,000 Da) or a mixture of chitosan polymer and oligomers (for the second solution). These combinations are preferred for there short reaction time and for the low permeability of the resulting microcapsules, especially preferred being combinations of sodium alginate with poly-(diallyldimethylammonium) chloride. Membrane permeability is preferably such as to allow the transfer of water or solvent between the liquid detergent and the core of the microcapsule but to preclude the leaching out of actives.

Measurement of Force Before Bursting

The force before bursting that a microcapsule can withstand can be measured by using a Dynamic Mechanical Analyser (Perkin Elmer DMA 7e). A single microcapsule is separated from the storage liquid (0.9% NaCl) and placed on the sample plate of the analyser. The capsule is covered with a drop of a 0.9% sodium chloride solution. To establish the force at the bursting point, a static strain scan is performed applying an increasing force of 20 mN/minute during the microcapsule compression. The imposed force and the displacement of the squeezed capsule are automatically recorded. The point of bursting corresponds to the first shoulder on the static force scan curve and in particular the intersection point of the two tangents constructed as a best fit to the upper and lower lateral portions of the shoulder.

Preferably, the microcapsules of the invention have a density of from about 900 to about 1,300 $Kg/m^3$, preferably from about 950 to about 1,200 Kg/m$^3$ and more preferably from about 980 to about 1,100 Kg/m$^3$ at 25° C.

The density of the microcapsules is measured using a Helium Pycnometer (Micromeritics AccuPyc 1330) at 21° C. and 25 psi. A microcapsule is taken from a 0.9% sodium chloride storage solution and gently patted with paper tissue to remove excess liquid before the measurement is taken.

The microcapsules of the invention are preferably essentially spherical in shape, especially when they are suspended in a liquid detergent. In addition the microcapsules preferably have a diameter (measured as equivalent circle diameter) in the range from about 0.2 to about 8 mm, preferably from about 0.5 to about 5 mm and more preferably from about 0.7 to about 4 mm, these ranges being preferred from the viewpoint that the microcapsules can be visualised with the naked eye and from ease of manufacture.

The size and shape of the microcapsules can be characterized using an optical microscope (Leica MZ8) and image analysis system (Leica Q500MC, Quips, UK). Before running the analysis the capsules are taken from a 0.9% sodium chloride solution and placed on the microscope table. During the measurement the capsules are kept wet using a 0.9% sodium chloride solution. Prior to processing of the images, it should be checked that all capsules are detected as single entities. The equivalent circle diameter is the diameter of a circle of an equivalent cross sectional area to that of the particle.

Preferably the microcapsules have a degree of elasticity at 25° C. of at least about 30%, more preferably at least about 50% and especially at least about 70%. The elasticity can be calculated using the Dynamic Mechanical Analyser described hereinabove. Elasticity is herein defined as the deformation of the capsule in the direction of movement of the plate before bursting as a percentage of the corresponding undeformed capsule dimension. The elasticity of the microcapsules contribute to their mechanically stability in liquid detergents.

Preferably, the core of the microcapsules includes an active material. Optionally, the shell can also include an active material. Preferably the active material is selected from hydrophobic materials and non-hydrophobic materials having a molecular weight higher than about 12,000. By "hydrophobic material" is herein understood a material having an octanol water partition coefficient at 25° C. higher than about 1, preferably higher than about 1.2 and more preferably higher than about 1.5. The octanol water coefficient partition of a material is defined as the ratio of the concentration of the material in the octanol phase to its concentration in the water phase at 25≅ C. Preferred hydrophobic materials for use herein include perfume oils, silicone fluids and gums, surfactants and vitamin oils. Preferred non-hydrophobic materials having a molecular weight higher than about 12,000 for use herein include enzymes. Other suitable actives include materials set out herein below. The microcapsules can provide protection for the active materials reducing or avoiding interaction between the active material in the core and materials in the liquid matrix of the liquid detergent, thereby improving the chemical stability of sensitive materials such as enzymes and perfumes. The retention of actives in the core of the microcapsules of the invention is higher than that for microcapsules produced by polymeric crosslinking, for example using calcium as crosslinking agent.

Preferably the core of the microcapsules of the invention includes a density modifier in a level such as to reduce the density of the microcapsules by at least about 10%, more preferably at least about 15% at 25° C. The density modifier helps to generate microcapsules of predetermined density which can be suspended in liquid detergents without or with low levels of structuring or thickening agents. By "low level" is meant less than about 5%, preferably less than about 1% and more preferably less than about 0.2% of structuring or thickening agent by weight of the detergent matrix. The density reduction is evaluated by comparing two similar microcapsules, the first one made from a solution containing a given level of density modifier and the second one from a solution wherein the density modifier has been substituted by the same weight of water. Density modifiers suitable herein preferably have a density of less than about 1,000 Kg/m$^3$, more preferably less than about 990 Kg/m$^3$ and higher than about 700 Kg/m$^3$, and especially higher than about 800 Kg/m$^3$. Suitable density modifiers include hydrophobic materials and materials having a molecular weight higher than about 12,000. Preferably the density modifier is insoluble but dispersible either with or without the aid of a dispersant agent, in water. Active materials can play the role of density modifiers if they fulfil the aforementioned requirements. Preferred density modifiers for use herein are selected from the group consisting of silicone oils, petrolatums, vegetable oils, especially sunflower oil and rapeseed oil, and hydrophobic solvents having a density of less than about 1,000 Kg/m$^3$ at 25° C., such as limonene and octane. The preferred density modifiers can be emulsified in the core of the microcapsules having the additional function of giving a whitish appearance to the microcapsules.

Process

The process of the present invention involves the complexation reaction of a polyanion and a polycation. Droplets of a first solution comprising a polyanion are dropped into a second solution comprising a polycation. The polyanion, when is in aqueous solution, fulfil the requirement of having a storage modulus of less than 150 Pa, under the conditions defined herein above.

Preferably, a density modifier is present in the first solution in a level of from about 5% to about 50%, preferably from about 10% to about 30% by weight.

The first and/or second solutions can comprise any solvent, including water and organic solvents. Preferably, the first and second solutions are aqueous, making the resulting microcapsules easily compatible with the majority of liquid detergents, which are usually aqueous. Preferably, the first and second solutions are aqueous compositions having the polyelectrolytes of opposite charge dissolved therein.

The process of the invention is preferably undertaken at ambient temperature thereby reducing the operating costs and allowing the encapsulation of heat sensitive materials.

The process of the invention is quick, simple, versatile, capable of high output and therefore suitable for large-scale production.

The droplets of the first solution can be generated by means of jet cutting. Jet cutting allows a high production rate and a narrow distribution of droplet size and permits the handling of solutions of high viscosity, i.e. solutions having viscosity of more than about 200 mPa s, preferably more than about 1,000 mPa s and more preferably more than about 2,000 mPa s as measured at 1 s$^{-1}$ and 25° C. Jet cutting can also handle solutions of complex rheology, for example shear thinning fluids.

Preferably, the jet of the first solution is formed by passing the solution through a nozzle having a diameter of from about 0.2 mm to about 8 mm, more preferably from about 0.5 mm to about 4 mm and a through put rate of from about 0.5 g/s to about 20 g/s, more preferably from about 1 g/s to about 6 g/s.

The jet is preferably cut by mechanical means, especially preferred being rotating cutting wires having a diameter of from about 10 µm to about 1,000 µm, more preferably from about 50 µm to about 500 µm, and a cutting speed of from about 500 rpm to about 10,000 rpm, more preferably from about 1,000 rpm to about 6,000 rpm.

Preferably, the first solution comprises the first polyanion in a level of from about 1% to about 15%, more preferably from about 2% to about 10%, especially from about 3% to about 8% by weight of the solution, this level being preferred for both the strength and the low permeability of the resulting microcapsules. Preferably the first polyelectrolyte has a viscosity of at least 100 mPa s, more preferably of at least 300 mPa s as measured at a shear rate of $1\ s^{-1}$ at 25° C. and at a concentration of 1% by weight, this viscosity being preferred for the high strength of the resulting microcapsules. Preferred for the process of the invention are first solutions comprising from about 2% to about 7%%, more preferably from about 3% to about 6%, especially from about 3.5% to about 5% by weight of sodium alginate, said sodium alginate having a viscosity of at least 100 mPa s, preferably of at least 300 mPa s as measured at a shear rate of $1\ s^{-1}$ at 25° C. and at a concentration of 1% by weight.

The solutions used in the process of the invention can be prepared by using any solvent, however aqueous solutions are preferred for reasons of availability and environmental profile and because of the compatibility of water with the majority of active substances and liquid detergents. The process is preferably carried out at ambient temperature, this being advantageous when dealing with heat sensitive materials such as perfumes and enzymes. However, if non-heat sensitive materials are encapsulated the solutions of the process can be heated in order to speed the kinetics of the complexation reaction.

The first solution preferably comprises a density modifier and/or an active material, dissolved, suspended or emulsified therein. The first solution can also comprise a dispersant or emulsifier, especially if the active material is hydrophobic, in order to facilitate the suspension or emulsification process, preferred dispersants for use herein being polymers, especially polyvinyl alcohol. Preferred emulsifiers for use herein are surfactants. Dispersants and/or emulsifiers are usually used in low levels, suitable levels for use herein being from about 0.1 to about 5%, preferably from about 0.2 to about 3% by weight of the first solution.

Actives suitable for use herein include any substance that contribute to the cleaning process such as surfactants, enzymes, builders and bleaching agents; and substances that provide additional benefits, such as suds suppressers, perfumes, especially perfume oils, vitamins, anti-microbial agents, colour protection agent, care additives, finishing agents, especially fabric softening, drying and shine additives.

The microcapsules are preferably coloured so they can be readily visualised when placed in liquid detergents.

Droplets can be formed by any known method. Preferably the droplets are formed by extruding the first solution through a nozzle into a coherent jet and cutting the jet, by cutting means, into cylindrical segments, which then form droplets, due to surface tension, on their way to the second solution. Preferred cutting means include rotating cutting wires. Suitable methods and devices for forming the droplets are described in DE 44 24 998 and WO 00/48722.

Usually the volume of second solution is at least 10 times, preferably at least 100 times and more preferably at least 1,000 times larger than that of a droplet, therefore, the amount of the second polyelectrolyte is well in excess over that of the first polyelctrolyte, thus the concentration of the polyelectrolyte in the second solution is not critical. Preferably the concentration of the second polyelectrolyte is from about 0.5% to about 5%, more preferably from about 0.8% to about 2% by weight of the solution. The pH of the second solution is selected according to the pH conditions for dissolution of the second polyelectrolyte. The residence time of the droplets is adjusted according to the desired shell thickness. Usually the reaction takes place under agitation conditions. Preferably the second solution has a pH of from about 1 to about 4, more preferably from about 1.5 to 3 and even more preferably from about 2 to about 2.5.

The liquid detergents of the invention comprise from about 0.5 to about 30%, preferably from about 0.7 to about 10%, more preferably from about 0.8 to about 2% microcapsules by weight of the composition. Suitable surfactants for use in the liquid detergents of the invention are well known and can be selected from anionic, nonionic, amphoteric and cationic surfactants, depending on the specific application of the detergent.

Builders suitable for use in the liquid detergents of the invention include builders that form water-soluble hardness ion complexes (sequestering builder) such as citrates and polyphosphates e.g. sodium tripolyphosphate and sodium tripolyphosphate hexahydrate, potassium tripolyphosphate and mixed sodium and potassium tripolyphosphate salts; and builders that form hardness precipitates (precipitating builder) such as carbonates e.g. sodium carbonate. Chelating agents can be selected from the acid or salt forms of organic phosphonates and aminophosphonates, aminocarboxylates, polyfunctionally-substituted aromatic compounds, and mixtures thereof. Also suitable for use herein are precipitating builders such as fatty soaps (fatty acids neutralized by Na or K hydroxides, or alkanolamines).

The detergent compositions herein can additionally comprise one or more detergent active or auxiliary components. Detergent actives may be selected from traditional detergent ingredients such as bleaching systems (including bleaching agents and bleach activators), alkalinity sources, enzymes, etc. Detergent auxiliaries may be selected from finishing agents and care agents. Some of these ingredients can be used in either or both of the microcapsules and the matrix of the liquid detergent.

Preferably, the detergent matrix is transparent or translucent, more preferably transparent, containing colored microcapsules and packaged in a clear, transparent or see through package.

EXAMPLES

Example 1

380 grams of sodium alginate from brown algae (Manucol DM ex ISP—having a MG ratio of about 61/39, a GG fraction of about 0.21 and a molecular weight of about 448 KDa) and 40 g of titanium dioxide (ex Sigma Aldrich product code T8141) was added to 9580 grams of deionised water and mixed to form a solution.

The above solution was extruded at throughput of 5.20 g/s through a 1.0 mm nozzle and cut using a rotational cutting tool (JetCutter from GeniaLab) containing 24 wires of 200 micron thickness with a cutting speed of 3400 rpm to form spherical droplets with a diameter between 1750 and 2250 microns. The droplets were allowed to fall into an agitated hardening bath that contained 75 litres of a 1% chitosan solution (Chitoclear ex Primex) brought to pH 1.5 with HCl.

After a hardening time of 15 minutes, the microcapsules were separated from the chitosan solution via filtration, washed with plenty of water and stored in a 1.0% NaCl solution.

Example 2

Filtered microcapsules of Example 1 were stirred into the laundry liquid detergent prepared as described hereinbelow. The microcapsules remained homogeneously suspended in the liquid detergent.

Example 3

Microcapsules of the formula given in Table A were made according to the following process: 80 grams of polyvinyl alcohol ((PVA), Mowiol 3-83 ex Clariant)) was added to 500 grams of deionised water and agitated at 70° C. to form a clear solution. 7040 g, in the cases of examples A1 and A2, and 6850 g, in the cases of examples A3 to A5, of deionised water was added to the solution in order to dilute the system.

Sodium alginate from brown algae (340 grams of Manucol DM ex ISP—having a M:G ratio of about 61/39, a GG fraction of about 0.21 and a molecular weight of about 448 KDa in the case of examples A1 and A2; and 530 grams of Manucol DH ex ISP having a M:G ratio of about 61/39, a GG fraction of about 0.18 and a molecular weight of about 289 KDa in the case of examples A3 and A5), 30 g bactericide (Thor acticide MBS), 10 g of titanium dioxide (ex Sigma Aldrich product code T8141) and the polyvinyl alcohol water solution were mixed to form a solution.

1000 grams of perfume and 1000 g of sunflower oil (e.g. ASDA sunflower oil) were pre-sheared for 5 minutes to form a phase liquid. This mixture was immediately added to the alginate mixture to form an opaque white liquid.

The resulting solution was extruded to form droplets that were cured in a chitosan (Chitoclear FG95 ex Primex) solution (having the pH indicated in table A) as in example 1.

TABLE A microcapsules composition (% by weight)

| | Example | | | | |
|---|---|---|---|---|---|
| | A1 | A2 | A3 | A4 | A5 |
| Alginate | 3.4 (DM) | 3.4 (DM) | 5.3 (DH) | 5.3 (DH) | 5.3 (DH) |
| Sunflower oil | 10 | 10 | 10 | 10 | 10 |
| PVA | 0.8 | 0.8 | 0.8 | 0.8 | 0.8 |
| Perfume | 10 | 10 | 10 | 10 | 10 |
| TiO2 | 0.1 | 0.1 | 0.1 | 0.1 | 0.1 |
| Acticide MBS | 0.3 | 0.3 | 0.3 | 0.3 | 0.3 |
| Chitosan | 0.17 | 0.17 | 0.17 | 0.17 | 0.17 |
| Water | to balance | to balance | to balance | to balance | to balance |
| pH chitosan | 1.5 | 2.0 | 2.5 | 2.0 | 2.5 |

Example 4

Filtered microcapsules of Example 3 were stirred into the laundry liquid detergent prepared as described hereinbelow. The microcapsules remained homogeneously suspended in the liquid detergent.

A structured liquid detergent matrix is prepared by combining an aqueous premix of conventional heavy duty liquid (HDL) detergent composition components with a structuring agent premix. Each of these two premixes is prepared as follows:

HDL Premix

The HDL components premix is prepared by combining HDL components with water in a suitable vessel under suitable agitation. The resulting premix has the composition shown in Table I.

TABLE I

HDL Components Premix

| Component | Concentration (Wt %) |
|---|---|
| C12LAS | 7.8 |
| C14-15E08 Alcohol Ethoxylate | 5.9 |
| C12-14Amine Oxide | 1.0 |
| Citric Acid | 2.1 |
| C12-18 Fatty Acid | 5.4 |
| Enzymes (Protease, Amylase, Mannanase) | 0.6 |
| MEA-Borate | 1.6 |
| DTPMP[1] Chelant | 0.2 |
| Ethoxylated Polyamine Dispersants | 1.2 |
| Silicone/Silica Suds Suppressor | 0.002 |
| Ethanol | 1.5 |
| Propane Diol | 5.2 |
| NaOH | 3.2 |
| Perfume, Brightner, Hydrotrope, Colorant, Other Minors | 4.4 |
| Water | Balance to 100% |

[1]Sodium diethylene triamine penta (methyl phosphonate)

Structuring Agent Premix

The structuring agent premix is prepared by combining hydrogenated castor oil and the other structuring agent premix ingredients shown in Table II with water under certain conditions. In particular, the Table II components except for the hydrogenated castor oil are combined and the resulting mixture is heated to 90° C. The hydrogenated castor oil is then added and the mixture is maintained under agitation until all of the hydrogenated castor oil has been emulsified. After full emulsification, the mixture is flash cooled to 70° C. and left at this temperature until all of the hydrogenated castor oil is re-crystallized. At this point the structuring agent premix is allowed to cool down slowly to ambient temperature. The resulting structuring agent premix has the composition shown in Table II.

TABLE II

Structuring Agent Premix

| Component | Concentration (Wt %) |
|---|---|
| Hydrogenated Castor Oil | 4.0 |
| C12HLAS | 16.0 |
| Sodium Metaborate | 1.5 |
| NaOH | 3.5 |
| Water | Balance to 100% |

HDL

As a next step, 2.5 parts of the structuring agent premix of Table II are added slowly to 96.5 parts of the HDL components premix of Table I under slow agitation forming the structured detergent matrix.

The microcapsules which are formed in accordance with the procedure of Example 1 are combined with the structured aqueous liquid detergent composition matrix. This is accomplished by slowly adding the microcapsules to the structured liquid matrix while it is maintained under gentle agitation. Enough microcapsules are added to constitute 1% by weight of the composition which is formed. The resulting heavy duty liquid laundry detergent product has the composition shown in Table III.

TABLE III

Microcapsule-Containing Liquid Laundry Detergent

| Component | Concentration (Wt %) |
|---|---|
| C12LAS | 7.9 |
| C14-15E08 Alcohol Ethoxylate | 5.7 |
| C12-14Amine Oxide | 1.0 |
| Citric Acid | 2.0 |
| C12-18 Fatty Acid | 5.2 |
| Enzymes (Protease, Amylase, Mannanase) | 0.6 |
| MEA-Borate | 1.5 |
| DTPMP1 Chelant | 0.2 |
| Ethoxylated Polyamine Dispersants | 1.2 |
| Silicone/Silica Suds Suppressor | 0.002 |
| Ethanol | 1.4 |
| Propane Diol | 5.0 |
| NaOH | 3.2 |
| Hydrogenated Castor Oil | 0.1 |
| Microcapsules from Example 1 | 1.0 |
| Perfume, Brightner, Hydrotrope, Colorant, Other Minors | 4.2 |
| Water | Balance to 100% |

180 ml of the microcapsules-containing liquid detergent was placed in a dosing ball. A wash load of 4-4.5 Kg dark garments was placed into a Miele Novotronic W8810 and the cotton short cycle at 30° C. was used. The temperature of the incoming water was cooled to a temperature of 5-6° C. The dosing ball was placed in approximately the middle of the washing load. The hardness of the water was 4 mmol/l. At the end of the cycle the washed garments were visually examined. No residues were found.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid detergent composition comprising:
   a) a surfactant;
   b) from about 0.01% to about 30% by weight of a chelant/builder;
   c) a microcapsule for use in a liquid detergent composition, the microcapsule having a core and a polymeric polyanion-polycation complex shell having a polycation component selected from the group consisting of chitosan, quaternarised chitosan, and mixtures thereof and having a polyanion component, wherein the polyanion component is alginate having a ratio of mannuronic to guluronic units (M:G ratio) of at least about 1.5:1 to about 4:1 and a fraction of guluronic/guluronic (GG) blocks of less than about 0.5, wherein the polyanion component is capable of gelling in the presence of calcium and said polyanion component has a storage modulus when gelled with 0.05 moles/liter of calcium of less than about 150 Pa at an angular frequency of about 0.5 rad/s and a polyanion concentration of about 3.8% by weight at 25° C.; wherein said microcapsule dissolves/disintegrates during a wash process.

2. A liquid detergent composition according to claim 1 wherein the polyanion has a molecular weight of less than about 500 KDa, and the polycation is chitosan.

3. A liquid detergent composition according to claim wherein the microcapsule comprises emulsified oil.

4. A liquid detergent composition according to claim 1 wherein the microcapsule is capable of withstanding a force before bursting of from about 20 mN to about 20,000 mN.

5. A liquid detergent composition according to claim 1, further comprising one or more enzymes comprising a protease.

6. A liquid detergent composition according to claim 1, wherein the M:G ratio is from about 1.5:1 to 3:1.

7. A liquid detergent composition according to claim 1, wherein the liquid detergent composition is a liquid laundry detergent composition.

8. A liquid detergent composition according to claim 7, wherein the liquid laundry detergent composition is a heavy duty liquid laundry detergent.

* * * * *